US008903598B2

(12) United States Patent
Wu et al.

(10) Patent No.: US 8,903,598 B2
(45) Date of Patent: Dec. 2, 2014

(54) TECHNIQUES FOR DETECTING SUPERCHARGER BELT SLIP

(71) Applicants: Zhijian James Wu, Rochester Hills, MI (US); Andrew P. Bagnasco, Plymouth, MI (US)

(72) Inventors: Zhijian James Wu, Rochester Hills, MI (US); Andrew P. Bagnasco, Plymouth, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/865,384

(22) Filed: Apr. 18, 2013

(65) Prior Publication Data

US 2014/0316641 A1 Oct. 23, 2014

(51) Int. Cl.
*G01M 17/00* (2006.01)
*F02D 23/00* (2006.01)
*F02D 23/02* (2006.01)

(52) U.S. Cl.
CPC .............. *F02D 23/005* (2013.01); *F02D 23/02* (2013.01)
USPC ......................... 701/33.9; 701/33.7; 701/34.4

(58) Field of Classification Search
CPC ... F02D 23/005; F02D 23/02; F02D 41/0007; G01M 17/00
USPC ........... 701/32.1, 33.9, 33.7, 29.1, 32.8, 34.4, 701/101, 103, 102
See application file for complete search history.

(56) References Cited

U.S. PATENT DOCUMENTS 7,573,219 B2 8/2009 Kees et al.
8,215,282 B2 * 7/2012 McDonald et al. ....... 123/198 R
2011/0204654 A1 * 8/2011 Hansen et al. ................ 290/1 R

FOREIGN PATENT DOCUMENTS

DE 4127635 A1 2/1993
EP 2392803 A1 12/2011
GB 2359380 A 8/2001
JP S5490406 A 7/1979
JP S60151445 A 8/1985
WO 2012/162630 A2 11/2012

OTHER PUBLICATIONS

International Search Report and Written Opinion dated Jul. 17, 2014 for International Application No. PCT/US2014/032954, International Filing Date Apr. 4, 2014.

* cited by examiner

*Primary Examiner* — Richard Camby
(74) *Attorney, Agent, or Firm* — Ralph E Smith

(57) ABSTRACT

A technique can include receiving, at a controller for a vehicle, the controller including one or more processors, a signal indicative of a pressure in an intake manifold of an engine of the vehicle. The vehicle can include a supercharger configured to supply pressurized air to the intake manifold. The supercharger can be driven by a crankshaft of the engine via a belt. The technique can include estimating, at the controller, a frequency of the signal to obtain an estimated frequency. The technique can include determining, at the controller, whether the belt is slipping based on a comparison between the estimated frequency and a predetermined frequency. The technique can also include outputting, at the controller, a notification when the belt is determined to be slipping.

20 Claims, 5 Drawing Sheets

TECHNIQUES FOR DETECTING SUPERCHARGER BELT SLIP

FIELD

The present disclosure relates generally to belt-driven superchargers for vehicles and, more particularly, to techniques for detecting supercharger belt slip.

BACKGROUND

A vehicle can include an internal combustion engine configured to generate drive torque to propel the vehicle. The engine can combine air and fuel to create an air/fuel mixture, which can be compressed and combusted within cylinders of the engine. The combustion of the compressed air/fuel mixture within the cylinders drives pistons, which rotatably turn a crankshaft to generate the drive torque. The drive torque can then be transferred to a drivetrain, e.g., four wheels, of the vehicle by a transmission to propel the vehicle.

The vehicle may include a supercharger, such as a positive-displacement supercharger, to increase performance. The supercharger can be configured to supply pressurized air to an intake manifold of the engine. The supercharger can be rotatably driven by the crankshaft of the engine via a suitable drive component (a gear, a chain, a belt, etc.). In the case of a belt-driven supercharger, the belt can wear over time, which can cause the belt to slip. Slipping of the belt can cause audible squealing and/or decreased performance (increased emissions, drive torque overshoots, etc.).

SUMMARY

In one form, a method is provided in accordance with the teachings of the present disclosure. The method can include receiving, at a controller for a vehicle, the controller including one or more processors, a signal indicative of a pressure in an intake manifold of an engine of the vehicle. The vehicle can include a supercharger configured to supply pressurized air to the intake manifold. The supercharger can be driven by a crankshaft of the engine via a belt. The method can include estimating, at the controller, a frequency of the signal to obtain an estimated frequency. The method can include determining, at the controller, whether the belt is slipping based on a comparison between the estimated frequency and a predetermined frequency. The method can also include outputting, at the controller, a notification when the belt is determined to be slipping.

In another form, a method is provided in accordance with the teachings of the present disclosure. The method can include receiving, at a controller for a vehicle, the controller including one or more processors, an intake manifold absolute pressure (IMAP) signal from an IMAP sensor configured to measure a pressure in an intake manifold of an engine of the vehicle. The vehicle can include a supercharger configured to supply pressurized air to the intake manifold. The supercharger can be driven by a crankshaft of the engine via a belt. The method can include sampling, at the controller, the IMAP signal in a crankshaft angle domain to obtain a sampled IMAP signal. The method can include filtering, at the controller, the sampled IMAP signal by removing noise components of the sampled IMAP signal to obtain a filtered IMAP signal. The method can include estimating, at the controller, an oscillation frequency of the IMAP signal by counting a number of zero-crossings of the filtered IMAP signal over N samples of the filtered IMAP signal in the crankshaft angle domain to obtain an estimated oscillation frequency, wherein N is a predetermined integer greater than one. The method can include determining, at the controller, whether the belt is slipping based on whether the estimated oscillation frequency has deviated by less than a predetermined amount from a predetermined frequency indicative of a normal oscillation frequency of the IMAP signal when the belt is not slipping. The method can also include outputting, at the controller, a notification when the estimated oscillation frequency has deviated by less than the predetermined amount from the predetermined frequency, the notification indicating that the belt should be repaired or replaced.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, a positive-displacement supercharger can be driven by an engine of a vehicle via a belt. The belt can wear over time, which can cause the belt to slip. The term "slip" with respect the belt can refer to the belt becoming periodically decoupled from the crankshaft and/or the supercharger due to insufficient friction. The insufficient friction can be due to the wearing of the belt over time. Slipping of the belt can cause audible squealing and/or decreased performance (increased emissions, drive torque overshoots, etc.). An additional sensor could be implemented to detect slipping of the belt, and when the sensor detects that the belt is slipping, a driver of the vehicle could be notified. Implementing this additional sensor, however, can increase costs and/or system complexity.

Accordingly, techniques are presented for detecting supercharger belt slip. The techniques can detect supercharger belt slip using a signal indicative of an intake manifold absolute pressure (IMAP), which can eliminate the need for an additional sensor and thereby can reduce costs and system complexity. The signal indicative of the IMAP can include frequency components that correspond to slipping of the belt. More specifically, a comparison of a measured oscillation frequency of this signal to an expected oscillation frequency can be used to detect whether the belt is slipping. In some implementations, the techniques can sample the signal in a crankshaft angle domain. The techniques can estimate a frequency of the signal by filtering the signal and performing a running count of zero-crossings of the filtered signal.

This estimation can also be less computationally-intensive and faster than other digital signal processing (DSP) techniques, which allow the techniques to detect supercharger belt slip in real-time. For example, the techniques can perform a running count of the zero-crossings over a last N samples (N>1). The techniques can compare the estimated frequency to a predetermined frequency corresponding to normal, i.e., non-slipping, operation of the engine and the supercharger. Based on this comparison, the techniques can output a notification that the belt needs to be repaired or replaced. In some cases, the techniques can also adjust engine operation to prevent drive torque overshoots caused by slipping of the supercharger belt.

Figure 1:
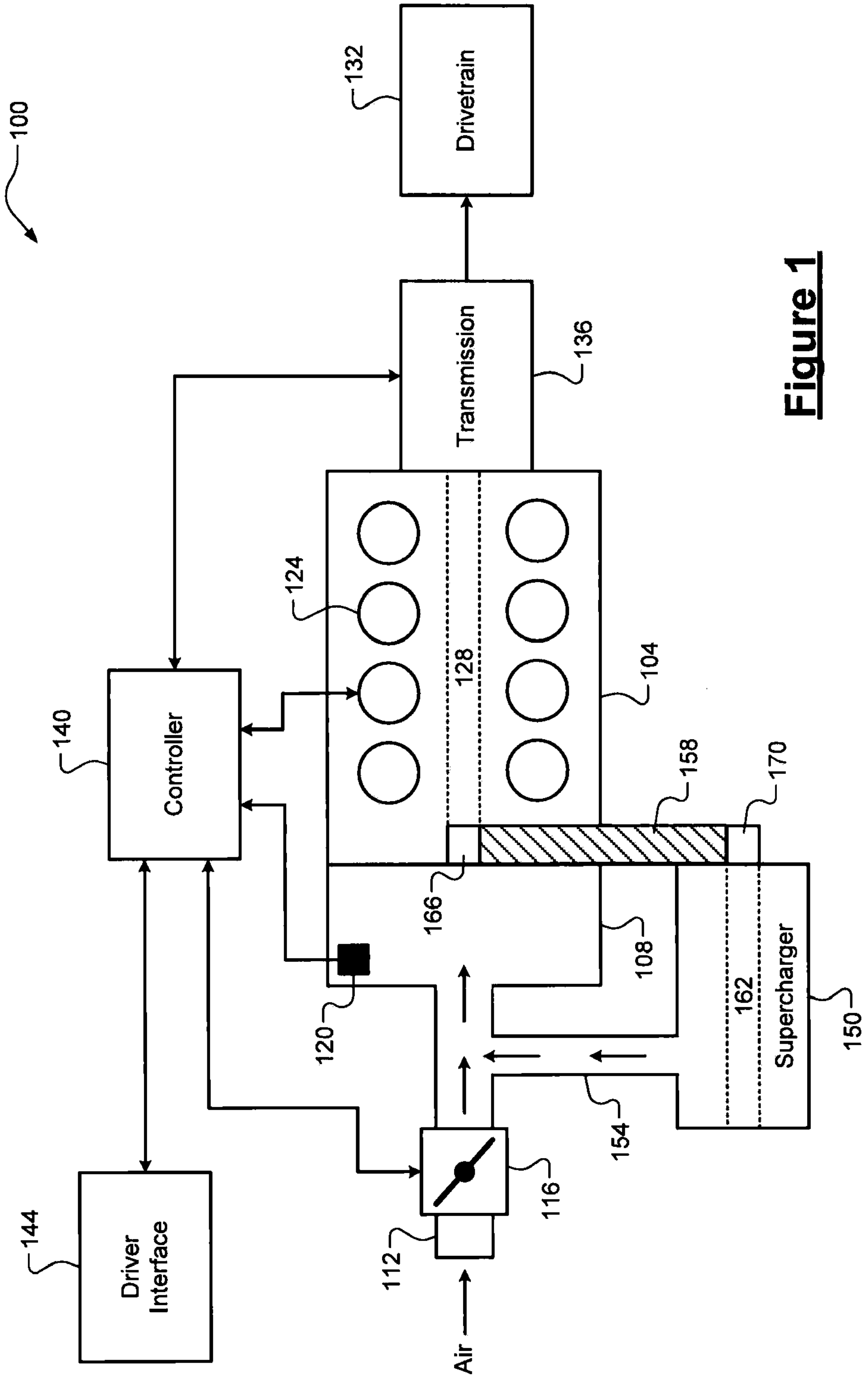
FIG. 1 is a functional block diagram of a vehicle including a belt-driven supercharger and a vehicle controller according to the principles of the present disclosure.

Referring now to FIG. 1, a functional block diagram of a vehicle 100 is illustrated. The vehicle 100 can include an internal combustion engine 104. The engine 104 can be any suitable engine configured to generate drive torque to propel the vehicle 100 (a spark ignition engine, a diesel engine, etc.). It should be appreciated that the vehicle 100 can be a hybrid vehicle and can include other suitable components, such as an electric motor and a battery system. The engine 104 can draw air into an intake manifold 108 through an intake system 112 that can be regulated by a throttle 116. The throttle 116 can be any suitable device to adjust the airflow into the intake manifold 108, e.g., a butterfly valve.

A sensor 120 can measure a pressure of air inside the intake manifold 108. The sensor 120 can also be referred to as an intake manifold absolute pressure (IMAP) sensor. The sensor 120 can be any suitable sensor (piezoelectric, piezoresistive strain gauge, capacitive, etc.) configured to generate a signal indicative of the pressure of the air inside the intake manifold 108 (hereinafter "IMAP signal"). It should also be appreciated that the IMAP signal could be obtained based on other parameters of the engine 104, such as signals from other sensors of the engine 104. The air in the intake manifold 108 can be distributed to a plurality of cylinders 124 and combined with fuel to create an air/fuel mixture. While eight cylinders are shown, it should be appreciated that other suitable numbers of cylinders can be implemented.

The air/fuel mixture in the cylinders 124 can be compressed by pistons (not shown) and combusted. The combustion of the compressed air/fuel mixture can drive the pistons, which can rotatably turn a crankshaft 128 to generate the drive torque. The drive torque can be transferred from the crankshaft 128 to a drivetrain 132, e.g., four wheels, of the vehicle 100 via a transmission 136. The transmission 136 can be any suitable transmission configured to transfer the drive torque generated by the engine 104 to the drivetrain 132 of the vehicle 100. Exhaust gas resulting from combustion of the compressed air/fuel mixture within the cylinders 124 can then be expelled from the cylinders 124 into an exhaust system (not shown).

A controller 140 can control operation of the vehicle 100. The controller 140 can receive input from a driver of the vehicle 100 via a driver interface 144. The driver interface 144 can include one or more suitable devices configured for communication between the driver of the vehicle 100 and the controller 140. For example, the driver interface 144 can include an accelerator pedal. Additionally, for example, the driver interface 144 can include an instrument panel or other suitable display device configured to notify the driver of various conditions of the vehicle 100. Based on the input from the driver, the controller 140 can control operation of the engine 104, including but not limited to controlling the throttle 116 and controlling fuel injection and combustion in the cylinders 124. The controller 140 can also implement the techniques of the present disclosure, which are illustrated in FIGS. 2-5 and described in detail below.

The vehicle 100 can also include a supercharger 150. The supercharger 150 can be any suitable positive-displacement supercharger (Roots-type, twin screw, sliding vane, scroll-type, etc.). While the supercharger 150 is illustrated and described as a positive-displacement supercharger, it should be appreciated that another suitable configuration, e.g., dynamic compressor, could be used. The supercharger 150 can supply pressurized air to the intake manifold 108, e.g., via a supercharger duct 154. The term "pressurized air" refers to air having greater than atmospheric pressure. The pressurized air in the intake manifold 108 can increase a volume of air being combusted in the cylinders 124 (also known as "forced induction"), which can increase the drive torque generated by the engine 104.

The supercharger 150 can be rotatably driven to pressurize the air for supply to the intake manifold 108. Specifically, the supercharger 150 can be driven by the crankshaft 128 of the engine 104 via a belt 158. The belt 158 can be made from any suitable flexible material, such as rubber. As the crankshaft 128 rotates, the belt 158 rotates a compressor 162 of the supercharger 150. The rotation of the compressor 162 generates the pressurized air that is supplied to the intake manifold 108. The belt 158 can be coupled to the crankshaft 128 via a first pulley 166, and the belt 158 can be coupled to the compressor 162 via a second pulley 170. A pulley ratio can define a size of the first pulley 166 with respect to a size of the second pulley 170. The pulley ratio is typically greater than one, which refers to the compressor 162 rotating faster than the crankshaft 128.

Figure 2:
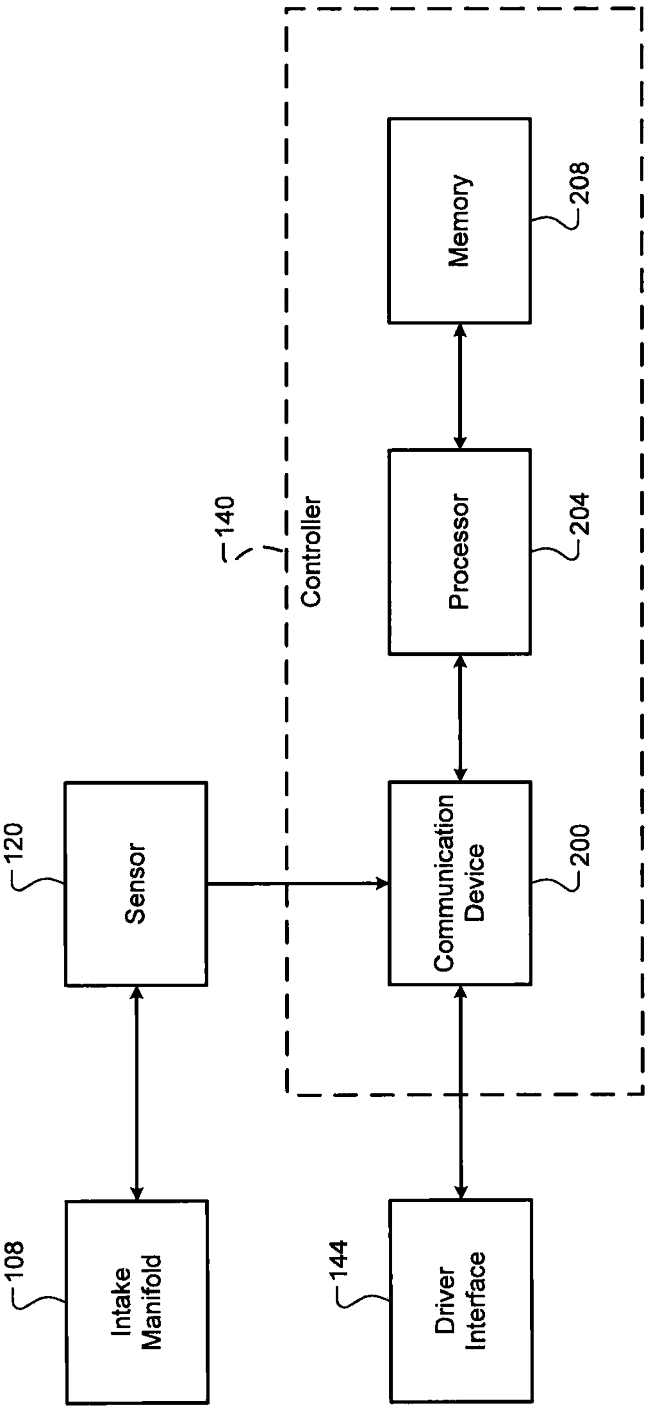
FIG. 2 is a functional block diagram of the vehicle controller according to the principles of the present disclosure.

Referring now to FIG. 2, a functional block diagram of the controller 140 is illustrated. The controller 140 can include a communication device 200 and a processor 204. It should be appreciated that the controller 140 can also include other suitable components, such as a memory 208. It should also be appreciated that the term "processor" as used herein can refer to both a single processor and two or more processors operating in a parallel or distributed architecture.

The communication device 200 can be configured to communicate with the driver interface 144. The communication device 200 can include any suitable components configured to communicate with the driver interface 144, such as controller area network (CAN) communication components. The communication device 200 can also be configured to receive the signal indicative of the pressure inside the intake manifold 108 (the IMAP signal) from the sensor 120. The communication device 200 can also be configured to communicate with the processor 204.

The processor 204 can control operation of the controller 140. The processor 204 can perform functions including, but not limited to loading/executing an operating system of the controller 140, controlling communication via the communication device 200, processing the IMAP signal from the sensor 120, and/or controlling read/write operations at the memory 208. The memory 208 can be any suitable storage medium configured to store information at the controller 140 (flash, hard disk, volatile/non-volatile, etc.). The processor 204 can also execute the techniques of the present disclosure, which are described in detail below.

Figure 3B:
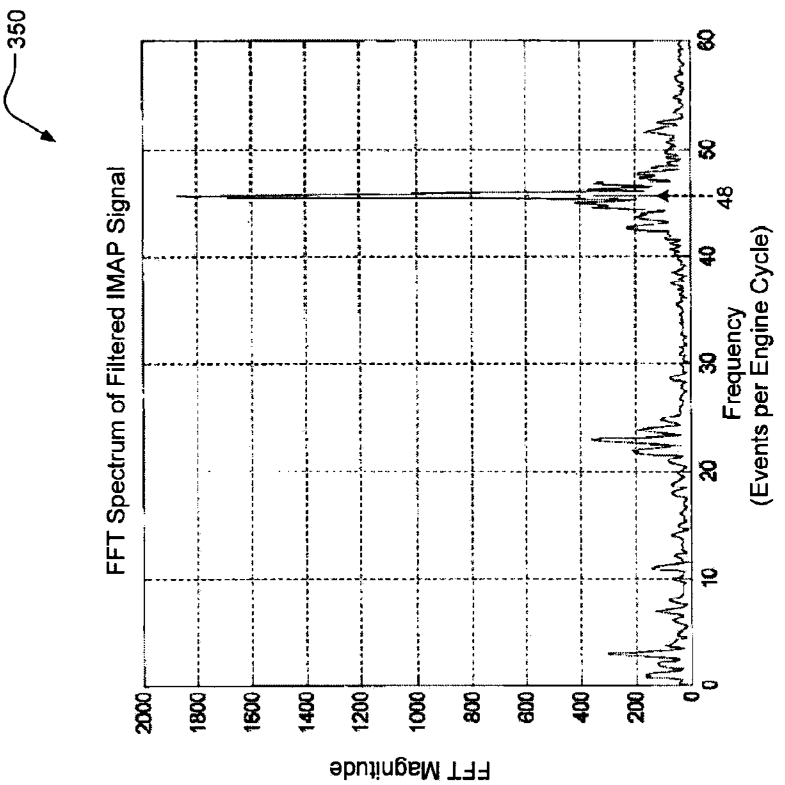
FIGS. 3A-3B are graphs illustrating processing of an example signal indicative of intake manifold absolute pressure (IMAP) according to the principles of the present disclosure.
Figure 3A:
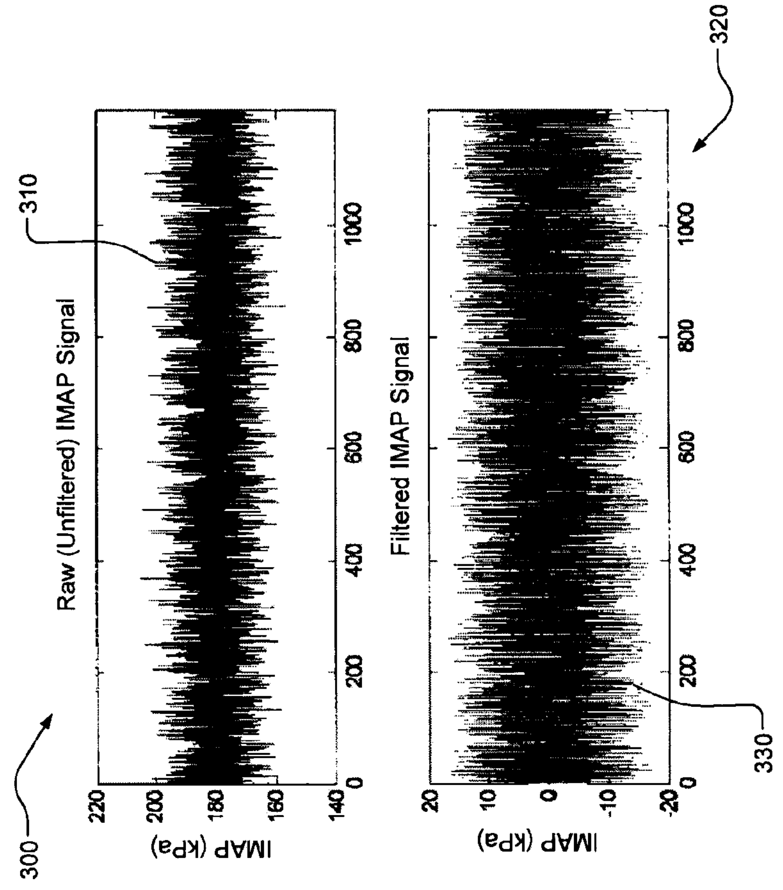

Referring now to FIGS. 3A-3B, graphs illustrating processing of an example IMAP signal are illustrated.

FIG. 3A illustrates a graph 300 of an example IMAP signal 310. The IMAP signal 310 can also be referred to as a raw or unfiltered IMAP signal. In other words, the IMAP signal 310 represents the IMAP signal from the sensor 120 before any processing, e.g., filtering. FIG. 3A also illustrates a graph 320 of a filtered IMAP signal 330. The filtered IMAP signal 330 represents a filtered version of the IMAP signal 310. For example, a band pass filter may be applied to the IMAP signal 310 to remove low and high frequency components from the IMAP signal 310 to obtain the filtered IMAP signal 330. It should be appreciated that the filtered IMAP signal 330 can also be scaled in comparison to the IMAP signal 310. It should also be appreciated that the IMAP signal 310 and the filtered IMAP signal 330 can either be continuous (non-sampled) signals or sampled signals, as previously described. In other words, the sampling of the techniques of the present disclosure can be performed before or after the filtering. As shown, the sampling has been performed prior to the filtering and the IMAP signal 310 is a sampled version of the IMAP signal from the sensor 120. As such, the horizontal axes of the graphs 300 and 320 represent samples. For example, the samples can be taken at predetermined intervals in the crankshaft angle domain.

FIG. 3B, on the other hand, illustrates a graph 350 of a fast Fourier transform (FFT) spectrum of the raw or unfiltered IMAP signal 310. As previously described, the techniques of the present disclosure can estimate the frequency of the IMAP signal by counting zero-crossings, and thus do not require computationally-intensive DSP techniques, such as an FFT. The graph 350 of the FFT is being illustrated, however, to indicate a normal oscillation frequency for an example system. The vertical axis represents the FFT spectrum magnitude, which can also be described as indicating frequency component intensity of the various frequencies indicated along the horizontal axis. The horizontal axis indicates a frequency, which can also be described as a number of events per engine cycle, e.g., per 360 crankshaft angle degrees. Each of these "events" can indicate an oscillation of the IMAP signal. As shown, the most common oscillation frequency (the normal or "predetermined" oscillation frequency) is 48 oscillations per engine cycle. In some implementations, it should be appreciated that the techniques of the present disclosure can use the counts for the various frequencies.

Referring again to FIG. 2 with continued reference to FIGS. 3A-3B, the processor 204 can receive the IMAP signal from the sensor 120. The processor 204 can sample the IMAP signal to obtain a sampled IMAP signal. For example, the sampling can be performed at predetermined intervals in the crankshaft angle domain. The processor 204 can then filter the sampled IMAP signal to obtain a filtered IMAP signal. For example, the filtering can include applying a band pass filter to remove noise components that are outside of a predetermined frequency range that is of interest for the belt slip detection. By removing these noise components, the various interferences in counting of oscillations can be reduced, and thus can help increase the accuracy and reliability of the frequency estimation. As previously described, however, it should be appreciated that the sampling could be performed after the filtering.

The processor 204 can then estimate a frequency of the filtered IMAP signal. Specifically, the processor 204 can count zero-crossings of the filtered IMAP signal. A zero-crossing can refer to when the filtered IMAP signal crosses from a positive magnitude to a negative magnitude or vice-versa. It should be appreciated that the techniques of the present disclosure could alternatively count when the filtered IMAP signal crosses a non-zero magnitude threshold, e.g., due to some offset in the IMAP signal. In some implementations, the processor 204 can perform a running count over a last N samples of the filtered IMAP signal (N>1). In doing so, the processor 204 can estimate the frequency of the IMAP signal in real time, as opposed to slower, more computationally-intensive DSP techniques, e.g., the FFT, which require much more data before processing can occur. The processor 204 can store the running count over the last N samples in the memory 208, and can periodically update the stored running count.

The processor 204 can then determine whether the belt 158 is slipping based on the estimated frequency of the IMAP signal. Specifically, the processor 204 can compare the estimated frequency to a predetermined frequency, e.g., the 48 oscillations per engine cycle of FIG. 3B. As previously explained, however, these computationally-intensive DSP techniques, such as the FFT, can be avoided by using the techniques of the present disclosure. Thus, the techniques of the present disclosure can determine this predetermined frequency based on (i) a compression ratio of the supercharger 150 and (ii) a ratio of the first and second pulleys 166 and 170, respectively, which couple the belt 158 to the crankshaft 128 and the supercharger 150 (the compressor 162), respectively. This ratio of the first and second pulleys 166 and 170 is also known as the pulley ratio, as previously described. The compression ratio of the supercharger 150, on the other hand, can be defined by the manufacturer or predetermined via testing.

The processor 204 can determine that the belt 158 is slipping when the estimated frequency has deviated more than a predetermined amount, e.g., a few counts, from the predetermined frequency. When the estimated frequency is within the predetermined amount from the predetermined frequency, however, the processor 204 can determine that the belt 158 is not slipping. When the belt 158 is determined to be slipping, the processor 204 can output a notification, e.g., to the driver interface 144. The notification can indicate that the belt 158 needs to be repaired or replaced. For example, the processor 204 may set a flag or a fault, and in response to this flag or fault being set, the driver interface 144 can notify the driver of the vehicle 100.

Additionally, the processor 204 can adjust operation of the vehicle 100 in response to determining that the belt 158 is slipping. Specifically, the processor 204 can adjust operation of the engine 104 to prevent torque overshoots that can be caused when the belt 158 is slipping. For example, when the belt 158 is slipping, the torque generated by the engine 104 may decrease, and thus a controller may typically attempt to increase the torque output of the engine 104 to meet a driver's request. In these situations, if the belt 158 stops slipping, i.e., catches due to friction, the torque output can increase to greater than a level desired by the driver's request, which is also known as a torque overshoot. These torque overshoots can be noticeable and unpleasant to the driver. Therefore, the processor 204 can adjust operation of the engine 104, e.g., adjust one or more parameters, to avoid these torque overshoots. For example only, the processor 204 could limit the driver's torque request when slipping of the belt 158 is detected.

Figure 4:
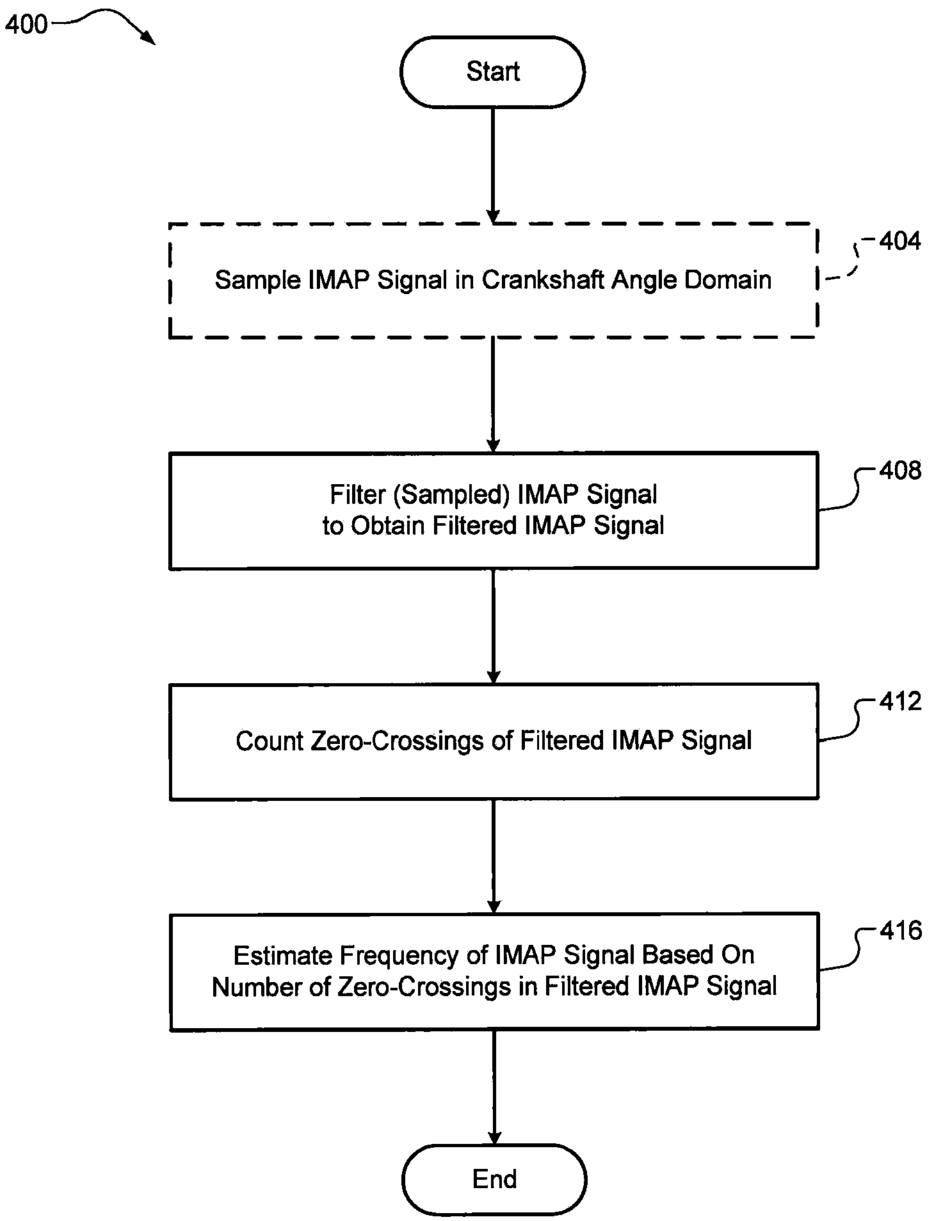
FIG. 4 is a flow diagram of a technique for estimating a frequency of a signal indicative of the IMAP according to the principles of the present disclosure.

Referring now to FIG. 4, a flow diagram of a technique 400 for estimating a frequency of the IMAP signal is illustrated. At 404, the controller 140 can sample the IMAP signal in a crankshaft angle domain to obtain a sampled IMAP signal. It should be appreciated that sampling at 404 may be optional, and therefore the technique 400 can begin at 404. At 408, the controller 140 can filter the sampled IMAP signal (or in some cases, the IMAP signal) to remove noise components to obtain a filtered IMAP signal. For example, the controller 140 may apply a band pass filter to remove the noise components from the sampled signal, the noise components including frequency components of the sampled signal that are outside of the predetermined frequency range indicative of the belt 158 operating normally. It should also be appreciated that the filtering (408) can be performed prior to the sampling (404).

At 412, the controller 140 can count a number of zero-crossings of the filtered IMAP signal. For example, the counting of the number of zero-crossings of the filtered IMAP signal may be performed over N samples of the filtered signal in the crankshaft angle domain (N>1). In some implementations, performing the counting of the number of zero-crossings of the filtered IMAP signal over the N samples in the crankshaft angle domain includes performing a running count of a last N samples. At 416, the controller 140 can estimate the frequency of the IMAP signal as being equal to the counted number of zero-crossings of the filtered IMAP signal. The technique 400 can then end or return to 404 (or 408) for one or more additional cycles.

Figure 5:
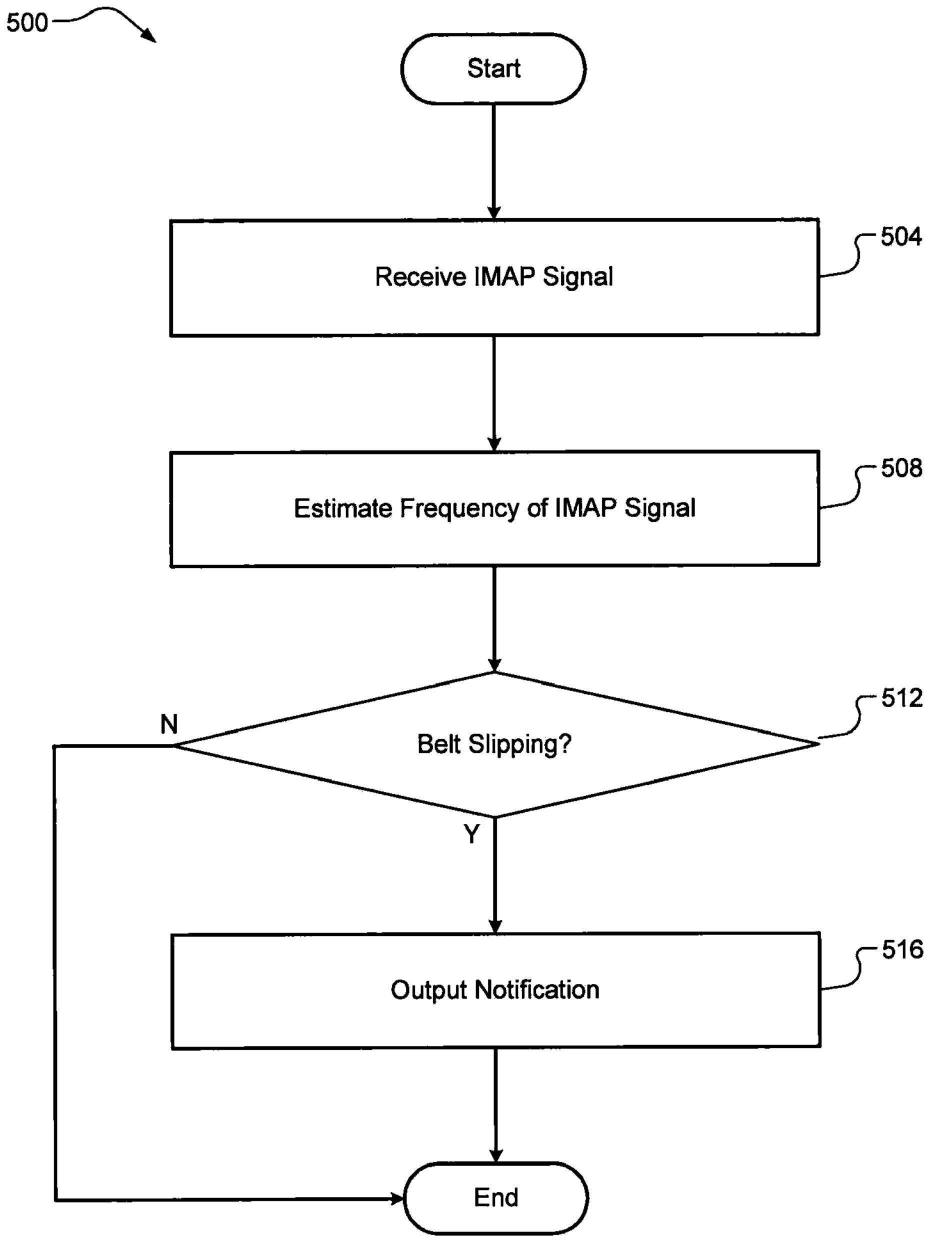
FIG. 5 is a flow diagram of a technique for detecting supercharger belt slip according to the principles of the present disclosure.

Referring now to FIG. 5, a flow diagram of a technique 500 for detecting supercharger belt slip is illustrated. At 504, the controller 140 can receive the IMAP signal, e.g., from the sensor 120. In some implementations, the controller 140 can sample the IMAP signal in a crankshaft angle domain. At 508, the controller 140 can estimate a frequency of the IMAP signal to obtain an estimated frequency (see FIG. 4 and its description above). At 512, the controller 140 can determine whether the belt 158 is slipping based on a comparison between the estimated frequency and a predetermined frequency.

If the belt 158 is determined to be slipping, the technique 500 can proceed to 516. If the belt 158 is determined to not be slipping, the technique 500 can end or return to 504 for one or more additional cycles. At 516, the controller 140 can output a notification when the belt 158 is slipping. In some implementations, the controller 140 can also adjust operation of the engine 104 in response to determining that the belt 158 is slipping to prevent torque overshoots. The technique 500 can then end or return to 504 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:

receiving, at a controller for a vehicle, the controller including one or more processors, a signal indicative of a pressure in an intake manifold of an engine of the vehicle, wherein the vehicle includes a supercharger configured to supply pressurized air to the intake manifold, and wherein the supercharger is driven by a crankshaft of the engine via a belt;

estimating, at the controller, a frequency of the signal to obtain an estimated frequency;

determining, at the controller, whether the belt is slipping based on a comparison between the estimated frequency and a predetermined frequency; and outputting, at the controller, a notification when the belt is determined to be slipping.

2. The method of claim 1, further comprising sampling, at the controller, the signal in a crankshaft angle domain to obtain a sampled signal, wherein the controller estimates the frequency of the sampled signal to obtain the estimated frequency.

3. The method of claim 2, wherein estimating the frequency of the signal includes filtering, at the controller, the sampled signal to remove noise components to obtain a filtered signal.

4. The method of claim 3, wherein filtering the sampled signal to obtain the filtered signal includes applying, at the controller, a band pass filter to remove the noise components from the sampled signal, the noise components including frequency components of the sampled signal that are outside of a predetermined frequency range.

5. The method of claim 4, wherein the predetermined frequency range includes frequency components that each have a high degree of confidence as being indicative of the belt operating normally.

6. The method of claim 3, wherein estimating the frequency of the sampled signal to obtain the estimated frequency further includes counting, at the controller, a number of zero-crossings of the filtered signal to obtain the estimated frequency.

7. The method of claim 6, wherein counting the number of zero-crossings of the filtered signal is performed over N samples in the crankshaft angle domain, wherein N is a predetermined integer greater than one.

8. The method of claim 7, wherein performing the counting of the number of zero-crossings of the filtered signal over the N samples in the crankshaft angle domain includes performing a running count of a last N samples.

9. The method of claim 1, wherein the predetermined frequency indicates a frequency of the signal when the belt is not slipping.

10. The method of claim 9, wherein determining whether the belt is slipping based on a comparison between the estimated frequency and a predetermined frequency includes determining, at the controller, whether the estimated frequency has deviated by greater than a predetermined amount from the predetermined frequency.

11. The method of claim 9, wherein the predetermined frequency is determined based on (i) a compression ratio of the supercharger and (ii) a ratio of first and second pulleys that couple the belt to the crankshaft and the supercharger, respectively.

12. The method of claim 1, wherein the signal is generated by an intake manifold absolute pressure (NAP) sensor that is configured to measure the pressure in the intake manifold of the engine.

13. The method of claim 1, further comprising controlling, at the controller, one or more operating parameters of the engine in response to determining that the belt is slipping to prevent torque overshoots of the engine.

14. The method of claim 1, wherein the notification indicates whether the belt should be repaired or replaced.

15. A method, comprising:

receiving, at a controller for a vehicle, the controller including one or more processors, an intake manifold absolute pressure (IMAP) signal from an IMAP sensor configured to measure a pressure in an intake manifold of an engine of the vehicle, wherein the vehicle includes a supercharger configured to supply pressurized air to the intake manifold, and wherein the supercharger is driven by a crankshaft of the engine via a belt;

sampling, at the controller, the IMAP signal in a crankshaft angle domain to obtain a sampled IMAP signal;

filtering, at the controller, the sampled IMAP signal by removing noise components of the sampled IMAP signal to obtain a filtered IMAP signal;

estimating, at the controller, an oscillation frequency of the IMAP signal by counting a number of zero-crossings of the filtered IMAP signal over N samples of the filtered IMAP signal in the crankshaft angle domain to obtain an estimated oscillation frequency, wherein N is a predetermined integer greater than one;

determining, at the controller, whether the belt is slipping based on whether the estimated oscillation frequency has deviated by greater than a predetermined amount from a predetermined frequency; and outputting, at the controller, a notification when the estimated oscillation frequency has deviated by greater than the predetermined amount from the predetermined frequency, the notification indicating that the belt should be repaired or replaced.

16. The method of claim 15, wherein filtering the sampled IMAP signal includes applying a band pass filter to the sampled IMAP signal to remove noise components from the sampled IMAP signal that are outside of a predetermined frequency range.

17. The method of claim 15, wherein estimating the oscillation frequency of the IMAP signal by counting the number of zero-crossings of the filtered IMAP signal includes performing a running count over a last N samples of filtered IMAP signal.

18. The method of claim 15, wherein the predetermined frequency is indicative of a normal oscillation frequency of the IMAP signal when the belt is not slipping.

19. The method of claim 15, wherein the predetermined frequency is determined based on (i) a compression ratio of the supercharger and (ii) a ratio of first and second pulleys that couple the belt to the crankshaft and the supercharger, respectively.

20. The method of claim 15, further comprising controlling, at the controller, one or more operating parameters of the engine in response to determining that the belt is slipping to prevent torque overshoots of the engine.

* * * * *